United States Patent
Akuzawa

(10) Patent No.: US 7,161,494 B2
(45) Date of Patent: Jan. 9, 2007

(54) VENDING MACHINE

(75) Inventor: Takayuki Akuzawa, Gunma-gun (JP)

(73) Assignee: Sanden Corporation, Isesaki (JP)

( * ) Notice: Subject to any disclaimer, the term of this patent is extended or adjusted under 35 U.S.C. 154(b) by 217 days.

(21) Appl. No.: 10/978,476

(22) Filed: Nov. 2, 2004

(65) Prior Publication Data

US 2005/0096223 A1    May 5, 2005

(30) Foreign Application Priority Data

Nov. 4, 2003   (JP)  ............................. 2003-374798

(51) Int. Cl.
*G08B 5/00*  (2006.01)
(52) U.S. Cl. .................. 340/815.4; 340/5.9; 340/5.91; 340/691.1; 340/691.6; 221/8
(58) Field of Classification Search ............ 340/815.4, 340/5.9, 5.91, 691.1, 691.6; 700/232; 221/8; 40/544
See application file for complete search history.

(56) References Cited

U.S. PATENT DOCUMENTS

| | | | |
|---|---|---|---|
| 4,954,697 A * | 9/1990 | Kokubun et al. ........... 235/381 |
| 5,831,862 A * | 11/1998 | Hetrick et al. .............. 700/232 |
| 5,959,869 A * | 9/1999 | Miller et al. ................ 700/231 |
| 6,834,452 B1 * | 12/2004 | Martin et al. ................. 40/544 |

FOREIGN PATENT DOCUMENTS

| JP | 09-270061 | 10/1997 |
|---|---|---|
| JP | 10-063929 | 3/1998 |
| JP | 11-007574 | 1/1999 |

* cited by examiner

*Primary Examiner*—Daryl C Pope
(74) *Attorney, Agent, or Firm*—Banner & Witcoff

(57) ABSTRACT

A vending machine has an input/output switching device between an image display device for displaying a still image and/or a moving image and a first image output device capable of outputting image data of a small data size in a predetermined signal form. This input/output switching device permits arbitrary connection of a second image output device capable of outputting image data of a large data size in a predetermined signal form.

4 Claims, 3 Drawing Sheets

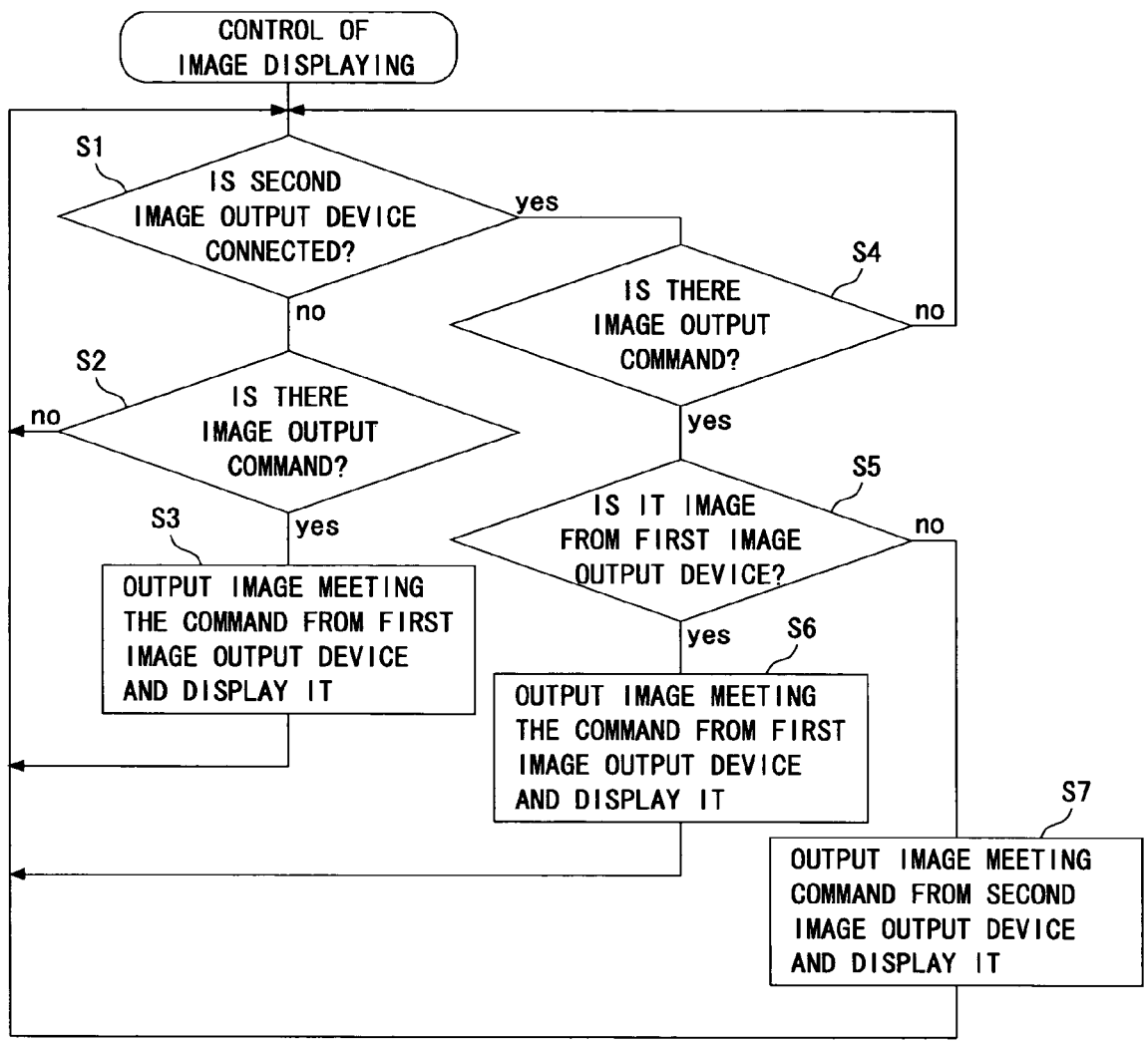

VENDING MACHINE

BACKGROUND OF THE INVENTION

1. Field of the Invention

The present invention relates to a vending machine for vending beverages in a cup or some other kind of container, and more particularly to a vending machine equipped with an image display device on the side facing customers for displaying a still or moving image.

2. Description of the Related Art

Among vending machines for vending beverages in a cup or some other kind of container, a type equipped with an image display device such as a cathode ray tube (CRT) or a liquid crystal display (LCD) on the side facing customers is known. This type of vending machine contributes to promoting products by displaying a still or moving image that represents, for instance, information on an operation to buy an article from the vending machine or information on the articles themselves.

Incidentally, when image data of a small size, such as a still image or moving image of low image quality or a short duration, are to be displayed, a storage media of a relatively small capacity, such as a memory card, can be used for storing the data. However, when image data of a large size, such as a moving image or a still image of high image quality, are to be displayed, the use of a storage media having a capacity in the order of gigabytes or even above, such as an optical disk or a hard disk, is indispensable.

Thus, in order to display a moving image containing a large amount of data on the image display device of the vending machine, an image output device for reading image data out of a storage media such as an optical disk or a hard disk and outputting image signals should be incorporated into the vending machine in advance. This would increases the price of the vending machine probably to a level of a substantial disadvantage in its marketing.

Since it is up to the preference of the buyer of the vending machine whether or not to display a moving image containing a large amount of data on the image display device of that vending machine, if the incorporation of the image output device was made optional, it would be possible to offer the vending machine meeting the requirements of each individual buyer. Alternatively, if an image output device which the buyer already owns or separately purchases could be fitted to the vending machine after the purchase of the vending machine, the buyer would be able to display a moving image or the like containing a large amount of data as necessary.

SUMMARY OF THE INVENTION

An object of the present invention is to provide a vending machine which allows incorporation, either optional or at the buyer's discretion, of an image output device for outputting a moving image or the like containing a large amount of data.

In order to achieve the object, a vending machine of the present invention comprises an image display device on its side facing customers; a first image output device capable of outputting image data of a small data size in a predetermined signal form; an input/output switching device connected to the first image output device, said input/output switching device making arbitrary connection of a second image output device capable of outputting image data of a large data size in a predetermined signal form, said input/output switching device permitting either one of the first image output device and the second image output device to transmit signals to the image display device in accordance with a command in a state in which the first image output device and the second image output device are connected; and an output image control device capable of controlling the outputting of image data from the first image output device and the second image output device and delivering the command to the input/output switching device.

According to this vending machine, the second image output device can be arbitrarily connected to the input/output switching device. Thus, in a state in which the first image output device is only connected, it is possible to display a still image or the like of a small data size. In a state in which both the first image output device and the second image output device are connected, the two image output devices can be selectively used to display a still image or the like of a small data size or a moving image or the like of a large data size as appropriate.

In other words, it is possible to offer a less expensive vending machine having no second image output device to a buyer who does not require displaying a moving image or the like of a large data size. It provides the convenience that such a buyer can display on the vending machine both a still image or the like of a small data size and a moving image or the like of a large data size if he subsequently adds the second image output device to the vending machine.

The aforementioned and other objects, features and advantages of the present invention will become more apparent from the following description when taken in conjunction with the accompanying drawings.

BRIEF DESCRIPTION OF THE DRAWINGS

FIG. 4 shows a program flow pertaining to image displaying.

DESCRIPTION OF THE PREFERRED EMBODIMENTS

Figure 1:
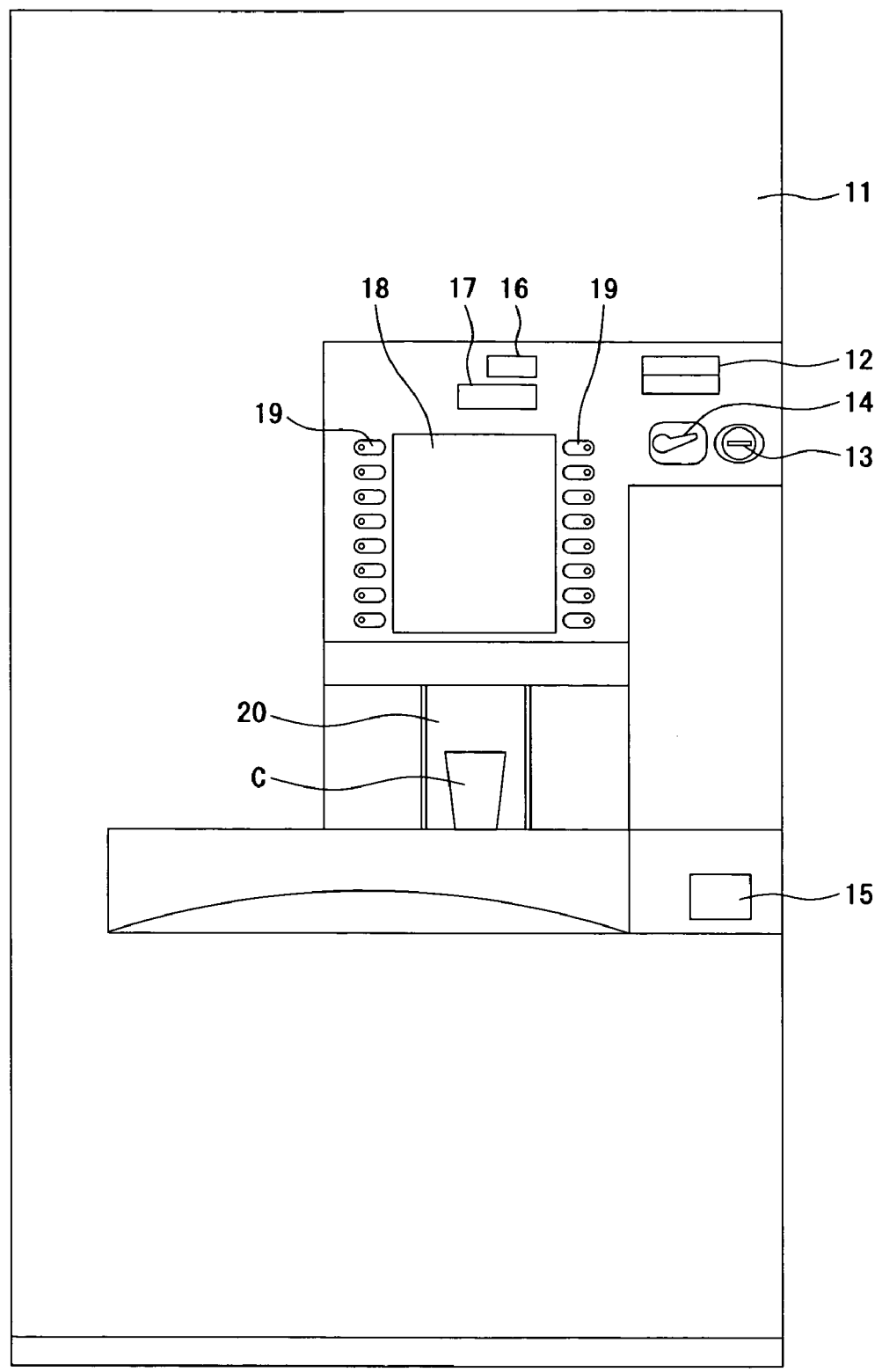
FIG. 1 shows an example of vending machine has an image display device on its side facing customers.

FIG. 1 shows an example of vending machine has an image display device on its side facing customers. This vending machine is a so-called drink dispenser which prepare a beverage, pour it into a cup C and offer it to a customer on the basis of selected menu by the customer after slotting money into the vending machine.

On the right hand side of the front face (the customer-facing side) of a body 11, there are disposed a paper money slot 12, a coin slot 13, a retrieve lever 14 and a returned coin outlet 15. To the left of the paper money slot 12 on the front face of the body 11, there are arranged an availability indicator 16 for showing a character display of either "ON SALE" or "NOT ON SALE", an input sum indicator 17 for indicating the sum of slotted money in numerals, an image display device 18 for displaying in a still image or a moving image information on the operation to buy an article or other information pertaining to the article, a plurality of control buttons 19 arranged to the right and left of the image display device 18, and a cup-contained beverage outlet 20. Description of the internal mechanism of this vending machine is dispensed with here, because it is no different from that of any known drink dispenser.

Figure 2:
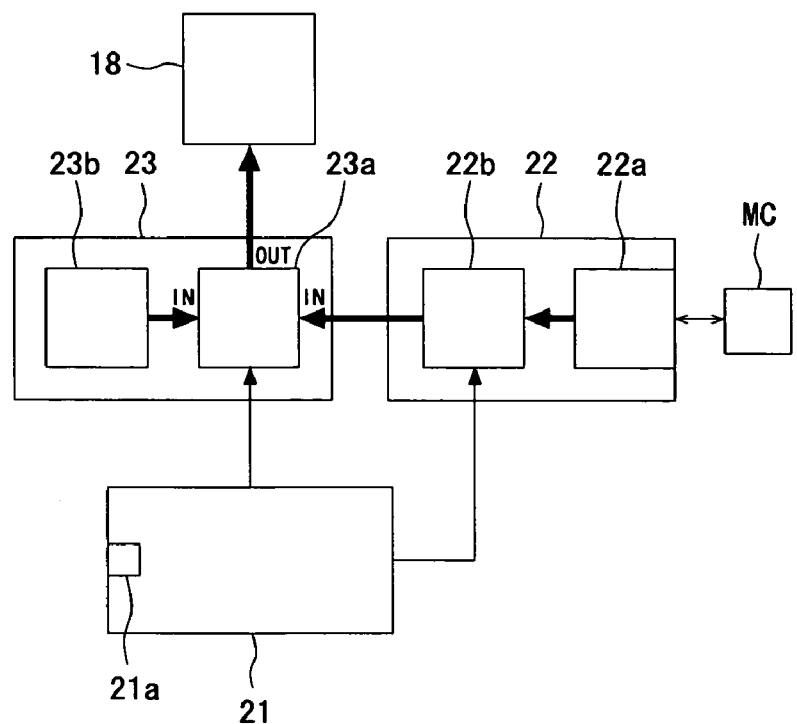
FIG. 2 shows an image display system provided in the vending machine shown in FIG. 1.

FIG. 2 shows an image display system provided in the vending machine shown in FIG. 1. The image display system is configured of the image display device 18 shown in FIG. 1, an output image control device 21, a first image output device 22 and an input/output switching device 23.

The image display device 18 consists of a known display device capable of displaying still images and moving images, such as a liquid crystal display (LCD), a plasma display panel (PDP) or a cathode ray tube (CRT). This image display device 18 has an analog RGB terminal as its image signal input terminal together with a controller and a driver for displaying images based on analog RGB signals.

The output image control device 21 is configured as a microcomputer having a CPU, a memory and other constituent elements. In this embodiment, a main controller for controlling the operations of the vending machine is used as this output image control device. This output image control device 21 has, stored in its memory, a program to be described afterwards for controlling the displaying of images on the image display device 18 in addition to a program for controlling the operations of the vending machine for vending its articles. The output image control device 21 is provided with a transmitter 21a for wireless transmission, to a receiver 31a of a second image output device 31 to be described afterwards, of signals for operating the second image output device 31, such as a frequency signal in the infrared domain.

The first image output device 22 is provided with a memory card reader 22a into and out of which a memory card MC is inserted and withdrawn, and an image output unit 22b to which the memory card reader 22a is connected. The image output unit 22b has an analog RGB terminal as its image signal output terminal, and the output terminal is connected to one of the input terminals of an input/output switching unit 23a to be described afterwards. This image output unit 22b reads predetermined image data out of the memory card MC inserted into the memory card reader 22a in accordance with a control signal from the output image control device 21, and outputs the data in an analog RGB signal form to one of the input terminals of the input/output switching unit 23a to be described afterwards.

Incidentally, the memory card MC stores various images to be displayed on the image display device 18 in the standby state and the article vending process, such as a still image to be displayed in the standby state, a still image showing the menu of available articles, a still image to be displayed during the waiting time until the cup-contained beverage is delivered, a short-duration moving image, and a still image to be displayed upon completion of the delivery.

The input/output switching device 23 is provided with the input/output switching unit 23a and a signal converting unit 23b connected to the other input terminal of the input/output switching unit 23a. The input/output switching unit 23a has two analog RGB terminals as its image signal input terminals, and one analog RGB terminal as its image signal output terminal. The output terminal is connected to the input terminal of the image display device 18. This input/output switching unit 23a so performs switching that either one of the input terminals and the output terminal be connected to each other in accordance with a control signal from the output image control device 21. The signal converting unit 23b has a composite terminal, an S terminal, a component terminal and a D terminal as its image signal input terminals, and an analog RGB terminal as its image signal output terminal. The output terminal is connected to the other input terminal of the input/output switching unit 23a. This signal converting unit 23b converts an image signal entered into either one of the input terminals into an analog RGB signal, and supplies it to the other input terminal of the input/output switching unit 23a.

Figure 3:
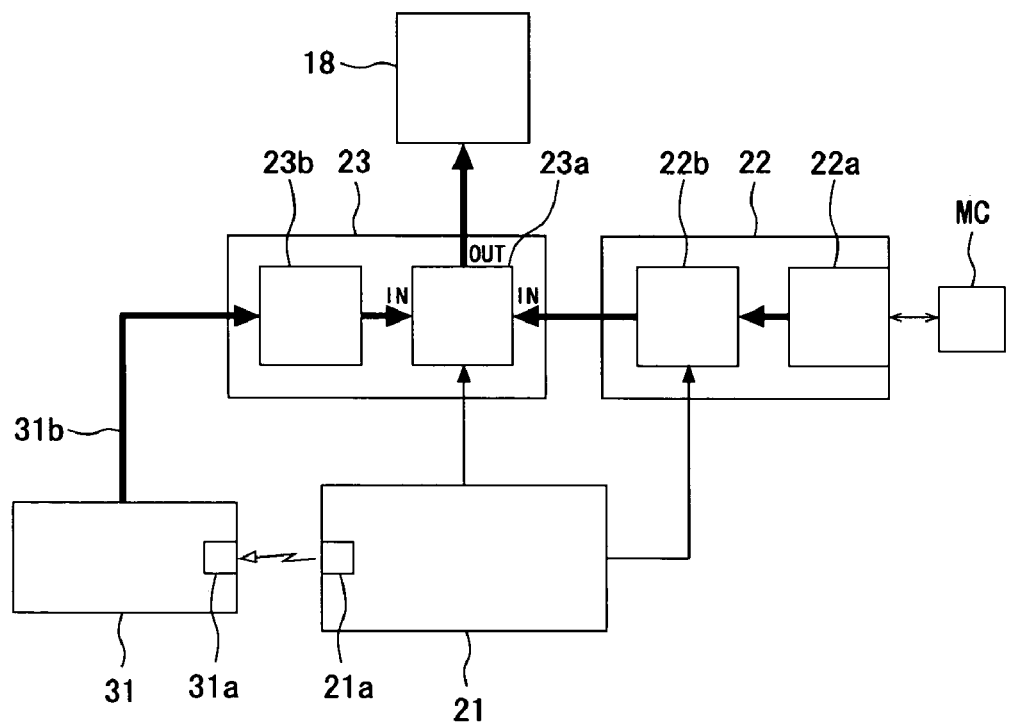
FIG. 3 shows a state in which a second image output device is incorporated into the image display system shown in FIG. 2.

FIG. 3 shows a state in which the second image output device 31 is incorporated into the image display system shown in FIG. 2.

The second image output device 31 consists of a general-purpose image output device equipped with an optical disk, such as a digital versatile disk (DVD), or a hard disk as its storage media. This second image output device 31 is equipped with the receiver 31a for receiving operational signals for reading predetermined image data, such as a frequency signal in the infrared domain, out of the storage media and outputting them. In incorporating this second image output device 31, the image signal output terminal of the second image output device 31 is connected by a cable 31b matching this terminal to either one of the input terminals of the signal converting unit 23b, and so sets the transmitter 21a that the operational signal matching the second image output device 31 be outputted wirelessly from the transmitter 21a of the output image control device 21.

Incidentally, the storage media, which may be an optical disk, a hard disk or the like, stores various images to be displayed on the image display device 18 in the standby state and the article vending process, such as a CM image to be displayed in the standby state, and an article introducing image or the like to be displayed during the waiting time until the cup-contained beverage is delivered.

The method of image displaying by the image display system shown in FIG. 2 and FIG. 3 will be described below with reference to a program flow charted in FIG. 4.

Since the incorporation of the second image output device 31 into the image display system is optional, the system will be as shown in FIG. 2 if the buyer does not demand its incorporation, while it will be as shown in FIG. 3 if the buyer demand its incorporation or subsequently adds the second image output device 31 to the vending machine.

In displaying an image, first, it is determined whether or not the second image output device 31 is connected (step S1 in FIG. 4).

If a command to output a predetermined image is given from the output image control device 21 to the first image output device 22 in a state in which the second image output device 31 is not connected, an analog RGB signal pertaining to the instructed image will be outputted from the first image output device 22 to the image display device 18 to display that image (steps S2 and S3 in FIG. 4).

On the other hand, if a command to output a predetermined image is given from the output image control device 21 to the first image output device 22 in a state in which the second image output device 31 is connected, the input/output switching unit 23a will be switched to the first image output device 22 side, and an analog RGB signal pertaining to the instructed image will be outputted from the first image output device 22 via the input/output switching unit 23a to the image display device 18 to display that image (steps S4 through S6 in FIG. 4).

Or if a command to output a predetermined image is given from the output image control device 21 to the second image output device 31 in the above state, i.e. the operational signal is transmitted from the transmitter 21a to the receiver 31a, the input/output switching unit 23a will be switched to the second image output device 31 side, and a composite signal, an S terminal signal, a component signal or a D terminal signal entered from the second image output device 31 to the signal converting unit 23b is converted into an analog RGB signal, which is outputted to the image display device 18 to display that image (steps S5 and S7 in FIG. 4).

The vending machine described above, since the second image output device 31 can be connected to its input/output switching device 23 as desired, can be offered at a lower price without incorporating the second image output device 31 to the buyer who does not require displaying of a moving image or the like containing a large amount of data. Moreover, it provides the convenience that it can be enabled to display a moving image or the like containing a large amount of data as well as a still image containing no large amount of data by subsequently adding the second image output device 31.

Furthermore, as the signal converting unit 23b of the input/output switching device 23 can convert the composite signal, the S terminal signal, the component signal or the D terminal signal into an analog RGB signal which is a signal form matching the input terminals (input interface) of the image display device 18, if the second image output device 31 outputs any one type of the image signals mentioned above, its equivalent can be accurately displayed on the image display device 18.

Furthermore, as the output image control device 21 has the transmitter 21a for operating the second image output device 31 wirelessly, even where a remote-controllable general-purpose DVD player, for instance, is to be used as the second image output device 31, a signal permitting remote control of the DVD player can be transmitted from the transmitter 21a. Moreover, where the second image output device 31 is to be fitted subsequently, any other wiring than the cable 31b can be dispensed with at the time of its adding.

In the embodiment of the invention described above, the image display device 18 is supposed to have the analog RGB terminal as its image signal input terminal. When an image display device 18 having only a digital RGB terminal as its image signal input terminal will be used, a converter for converting analog RGB signals into digital RGB signals should be provided to intervene between the image display device 18 and the input/output switching device 23.

Although the first image output device 22 in the embodiment described above uses a memory card MC as its storage media, a first image output device 22 having a hard disk, a magnetic disk or the like capable of storing still images containing only a small amount of data as its storage media can be used as well.

Further in the embodiment described above the input/output switching unit 23a of the input/output switching device 23 has two input terminals, if an input/output switching unit having three or more input terminals and an additional signal converting unit or units 23b are provided according to the number of input terminals, a plurality of second image output devices 31 can be used.

The embodiment described above is a vending machine for cup-contained beverages, but the invention can be applied as effectively to not only vending machines for beverages in other kinds of container but also for any other type of vending machine if only it has an image display device for displaying a still image or a moving image on the side facing customers.

The preferred embodiment of the present invention described in this specification is only illustrative but not restrictive. The scope of the present invention is set forth in the appended claims, and all modifications within the scope of what are meant by the claims fall within the coverage of the invention.

What is claimed is:

1. A vending machine having an image display device on its side facing customers, comprising:

a first image output device capable of outputting image data of a small data size in a predetermined signal form;

an input/output switching device connected to the first image output device, said input/output switching device making arbitrary connection of a second image output device capable of outputting image data of a large data size in a predetermined signal form, said input/output switching device permitting either one of the first image output device and the second image output device to transmit signals to the image display device in accordance with a command in a state in which the first image output device and the second image output device are connected; and an output image control device capable of controlling the outputting of image data from the first image output device and the second image output device and delivering the command to the input/output switching device, wherein the second image output device is a device capable of reading out image data stored in an optical disk or a hard disk and outputting image data in a predetermined signal form.

2. The vending machine according to claim 1, wherein the input/output switching device includes a signal convening unit for converting output signals from the second image output device into a signal form matching the input terminal of the image display device.

3. The vending machine according to claim 1, wherein the output image control device includes a transmitter capable of wireless transmission of an operational signal for controlling the outputting of image data from the second image output device, and the second image output device is provided with a receiver for receiving the operational signal.

4. The vending machine according to claim 2, wherein the output image control device includes a transmitter capable of wireless transmission of an operational signal for controlling the outputting of image data from the second image output device, and the second image output device is provided with a receiver the receiving the operational signal.

* * * * *